UNITED STATES PATENT OFFICE.

DERICK H. FITCH, OF CAZENOVIA, NEW YORK.

SOLUTION FOR GALVANIC BATTERIES.

SPECIFICATION forming part of Letters Patent No. 361,004, dated April 12, 1887.

Application filed November 13, 1886. Serial No. 218,795. (No specimens.)

*To all whom it may concern:*

Be it known that I, DERICK H. FITCH, a citizen of the United States, residing at Cazenovia, in the county of Madison and State of New York, have invented a new and useful Compound, Solution or Liquid to be Used in Galvanic Batteries, of which the following is a specification.

The object of my invention is to produce a compound, composition or mixture composed of soluble ingredients which contain large proportions or percentages of oxygen and chlorine in chemical combination, and which have little or no tendency to change or decompose or unite with the zinc while the circuit is open and no electrical current flowing, but which do change or decompose easily, unite with the zinc, and form new or other compounds, and thus generate electricity while the circuit is closed.

The efficiency of a battery solution, liquid, excitant, depolarizer, or electrolyte is in proportion to the percentage of available oxygen or chlorine which it contains, and the greatest economy is realized when such materials containing large percentages of these elements are selected and combined as have little tendency to chemical change while the circuit is open, but which do change and generate electricity while the circuit is closed. To attain these objects, I make a battery solution or excitant by dissolving chloride of ammonium (sal-ammoniac) and chlorate of potassium or chlorate of sodium together in water. The former contains more than sixty-six per cent. of its total weight of chlorine, the second more than thirty-nine per cent., and the third more than forty-five per cent. of their total weights of oxygen. These ingredients may be combined in any proportion; but preferably a nearly saturated solution of these materials in nearly their chemical combining proportions as expressed in connection with zinc in the following equations: $12NH_4Cl + K_2OCl_2O_5 + 6Zn = 2KCl + 12NH_3 + 6H_2O + 6ZnCl_2$; or $12NH_4Cl + Na_2OCl_2O_5 + 6Zn = 2NaCl + 12NH_3 + 6H_2O + 6ZnCl_2$.

The compound thus described may be used in batteries of any form or mechanical construction.

What I claim as my invention, and desire to secure by Letters Patent, is—

A battery compound, liquid, composition, solution, excitant, depolarizer, or electrolyte made by dissolving chloride of ammonium and chlorate of potassium or chlorate of sodium together in water.

DERICK H. FITCH.

Witnesses:
J. W. HOWSON,
J. A. PARKER.